Patented June 2, 1925.

1,540,510

UNITED STATES PATENT OFFICE.

ARTHUR ZITSCHER, OF OFFENBACH-ON-THE-MAIN, GERMANY, ASSIGNOR TO THE CORPORATION OF CHEMISCHE FABRIK GRIESHEIM-ELEKTRON, OF FRANKFORT-ON-THE-MAIN, GERMANY.

BIS-(2.3-HYDROXYNAPHTHOYL)-4.4'-DIAMINO-3.3'-DIALKYLOXY-DIARYLS.

No Drawing.   Application filed November 30, 1923. Serial No. 677,879.

*To all whom it may concern:*

Be it known that I, ARTHUR ZITSCHER, a citizen of Germany, and resident of Offenbach-on-the-Main, Germany, have invented new and useful Improvements in Bis-(2.3-Hydroxynaphthoyl) - 4.4' - Diamino - 3.3'- Dialkyloxy-Diaryls, of which the following is a specification.

My invention relates to new compounds, not known hitherto, the bis-(2.3-hydroxynaphthoyl)-4.4' - diamino - 3.3' - dialkyloxydiaryls of the general formula:

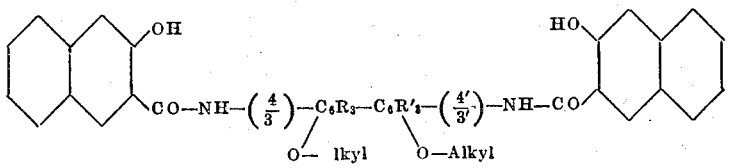

wherein R and R' mean the same or different monovalent substituents, yielding, when combined with diazocompounds, valuable dyestuffs.

These bodies are obtained by causing 2.3-hydroxynaphthoic acid and a dehydrating agent such as phosphorus trichlorid, thionylchlorid, to react upon the 4.4'-diamino-3.3'-dialkyloxy-diaryls, advantageously in a solvent or diluent.

The following example illustrates the invention, the parts being by weight, and all temperatures being in centigrade degrees.

*Example.*

188 parts of 2.3-hydroxynaphthoic acid are suspended in xylene, a solution of 122 parts of dianisidin in xylene is added while stirring and 60 parts of phosphorus trichlorid are dropped in. The mass is now boiled under the reflux condenser, while continuously stirring, until evolution of hydrogen chloride ceases; then sodium carbonate is added until the reaction is alkaline, and the xylene is expelled by steam. The residue is filtered and well washed. For rectification the product is treated with diluted hydrochloric acid at about 70°, filtered and washed, until the reaction is neutral. Then the residue is dissolved in hot diluted caustic soda solution, the solution is filtered and the bis-(2.3-hydroxynaphthoyl)-dianisidin is separated by means of an acid. The product is filtered, well washed and dried. When crystallized from ortho-nitrotoluene, the bis-(2.3-hydroxynaphthoyl)-dianisidin is obtained in almost colorless little crystals, grown together to twins, melting at 348° (not corrected) under decomposition. It is soluble in diluted caustic soda solution to a brownish yellow solution and is very little soluble in the usual organic solvents.

The bis-(2.3-hydroxynaphthoyl)-diphenetidin prepared in a similar manner, is obtained from nitrobenzene in almost colorless needles melting at 346–348° (not corrected). It is soluble in diluted caustic soda solution to a brownish yellow solution and is very little soluble in the usual organic solvents.

In a similar manner also other bis-(2.3-hydroxynaphthoyl) - 4.4' - diamino - 3.3'- dialkyloxydiaryls can be prepared.

Now what I claim and desire to secure by Letters Patent is the following.

1. As new articles the bis-(2.3-hydroxynaphthoyl) - 4.4' - diamino - 3.3'-dialkyloxynaphthoyl) - 4.4' - diamino - 3.3'-dialkyloxydiaryls, having probably the general formula:

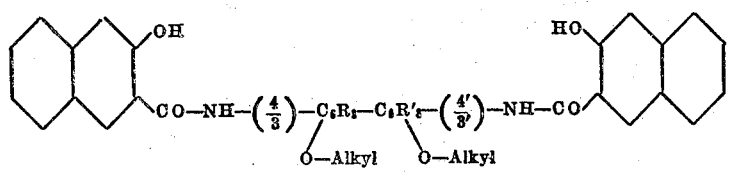

wherein R and R' mean the same or different monovalent substituents, which are when dry almost colorless crystalline powders, soluble in diluted caustic soda solution to a brownish yellow solution and very little soluble in the usual organic solvents.

2. As new article the bis-(2.3-hydroxy-naphthoyl)-dianisidin, having probably the formula:

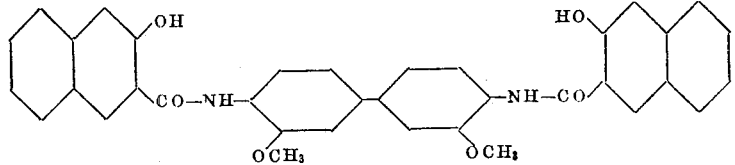

which is when dry an almost colorless crystalline powder, soluble in diluted caustic soda solution to a brownish yellow solution and very little soluble in the usual organic solvents.

In testimony, that I claim the foregoing as my invention, I have signed my name, this 15th day of November 1923.

ARTHUR ZITSCHER.

Witnesses:
PETER LAUTENSCHLÄGER,
FRITZ DESOR.